US012582134B2

(12) United States Patent
Chang et al.

(10) Patent No.: US 12,582,134 B2
(45) Date of Patent: Mar. 24, 2026

(54) NON-DAIRY CREAMER AND METHOD OF MAKING THE SAME

(71) Applicant: Cargill, Incorporated, Wayzata, MN (US)

(72) Inventors: Guifang Chang, Jiangsu (CN); Yun Ge, Jiangsu (CN); Weifeng Huang, Beijing (CN); Yaobin Si, Shanghai (CN)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 17/758,156

(22) PCT Filed: Dec. 22, 2020

(86) PCT No.: PCT/US2020/066564
§ 371 (c)(1),
(2) Date: Jun. 29, 2022

(87) PCT Pub. No.: WO2021/138142
PCT Pub. Date: Jul. 8, 2021

(65) Prior Publication Data
US 2023/0049488 A1 Feb. 16, 2023

Related U.S. Application Data

(60) Provisional application No. 62/972,697, filed on Feb. 11, 2020.

(30) Foreign Application Priority Data

Dec. 30, 2019 (CN) .......................... 201911422641.5

(51) Int. Cl.
*A23C 11/02* (2025.01)
*A23D 9/04* (2006.01)
*A23L 9/20* (2016.01)

(52) U.S. Cl.
CPC ................ *A23C 11/02* (2013.01); *A23D 9/04* (2013.01); *A23L 9/20* (2016.08); *A23V 2002/00* (2013.01)

(58) Field of Classification Search
CPC ......... A23C 11/02; A23C 11/04; A23C 11/10; A23D 9/04; A23D 9/00; A23L 9/20; A23V 2002/00; A23V 2200/262; A23V 2200/264; A23V 2250/1872; A23V 2250/1878; A23V 2250/188; A23V 2250/1886; A23V 2250/1942; A23V 2250/1944
See application file for complete search history.

(56) References Cited

U.S. PATENT DOCUMENTS 5,932,275 A 8/1999 Nalur

FOREIGN PATENT DOCUMENTS

| CN | 104413172 A | * | 3/2015 | |
| CN | 107821642 A | | 3/2018 | |
| CN | 107484839 B | | 7/2021 | |
| WO | 2008002139 A1 | | 1/2008 | |
| WO | WO-2017203358 A1 | * | 11/2017 | .......... A23D 7/0053 |
| WO | 2018020813 W | | 2/2018 | |

OTHER PUBLICATIONS

Machine Translation of Chen et al, CN 104413172, Mar. 2015 (Year: 2015).*

* cited by examiner

*Primary Examiner* — Emily M Le
*Assistant Examiner* — Tynesha L Mcclain

(57) ABSTRACT

The present invention relates to a non-dairy creamer including a triglyceride composition. The triglyceride composition includes triglycerides having a specific fatty acid profile. The triglyceride composition has a trans fatty acid value of from about 0 wt % to about 1 wt % by weight of the total fatty acid content, an oxidative stability index of greater than about 15 h at a temperature of 120° C. and an airflow rate of 20 L/h, a saturated fatty acid content of from about 55 wt % to about 65 wt % by weight of the total fatty acid content, a slip melting point of from about 22° C. to about 40° C., and a total volatile aldehyde content of from about 1 wt % to about 5 wt % by weight of the triglyceride composition.

30 Claims, No Drawings

NON-DAIRY CREAMER AND METHOD OF MAKING THE SAME

CROSS REFERENCE TO RELATED APPLICATIONS

This application is a national phase application of PCT/US2020/066564, filed 22 Dec. 2020, entitled A NON-DAIRY CREAMER AND METHOD OF MAKING THE SAME which claims the benefit of China Patent Application No.: 201911422641.5, filed 30 Dec. 2019, entitled A NON-DAIRY CREAMER AND METHOD OF MAKING THE SAME and U.S. Provisional Patent Application No. 62/972,697, filed 11 Feb. 2020, entitled A NON-DAIRY CREAMER AND METHOD OF MAKING THE SAME which are hereby incorporated by reference in their entirety.

FIELD OF THE INVENTION

The present invention generally relates to the technical field of non-dairy creamers.

BACKGROUND OF THE INVENTION

Non-dairy creamers, also referred to as beverage whiteners, are milk or cream substitutes added to beverages such as coffee, tea and hot chocolate. Non-dairy creamers come in both liquid and granular forms.

Quite often, non-dairy creamers use hydrogenated oils as base oils. Hydrogenated oils not only provide good texture and mouthfeel, but also deliver a long lasting, shelf-stable special flavor. The special flavor of hydrogenated oils is referred to as hydrogenated flavor, which some people would describe as dairy-like and associate with sweet pastries.

However, hydrogenated oils, when only partially hydrogenated, contain trans fats. Indeed, in an information sheet provided by the World Health Organization entitled "POLICIES TO ELIMINATE INDUSTRIALLY-PRODUCED TRANS FAT CONSUMPTION" (accessible online via WHO's website at: https://www.who.int/docs/default-source/documents/replace-transfats/replace-act-information-sheet.pdf?ua=1) identifies partially hydrogenated oils as the main source of industrially-produced trans fats. Taking hydrogenated soybean oil as an example, hydrogenated soybean oil is conventionally used as a base oil for non-dairy creamers, and may have a trans fatty acid content of 40% or more.

Trans fats raise the low-density lipoprotein (known as the "bad cholesterol") level and lower the high-density lipoprotein (known as the "good cholesterol") level, and thus contribute to higher risks of heart attacks, heart disease, etc. Trans fats have also been associated with the development of type 2 diabetes. Many countries, such as Denmark, have enacted laws and regulations setting limits on the use of trans fats in foods. Some other countries, such as the US and Canada, have gone even further and ban the use of partially hydrogenated oils in foods.

Specific compounds contributing to the peculiar flavor of hydrogenated soybean oil have been identified, such that suitable substitutes therefor can be developed. For instance, in "Identification of Volatile Flavor Compounds Developed during Storage of a Deodorized Hydrogenated Soybean oil" (Yasuda, et al., J Am Oil Chem Soc (1975) 52: 307. https://doi.org/10.1007/BF02637732), Yasuda, et al. reported the separation and identification of volatile compounds that appear to contribute to the flavor of hydrogenated soybean oil. However, this paper does not address the issue of substitutes for hydrogenated soybean oil.

PCT application WO 2013/027439 A1 entitled "Oxidized partially hydrogenated oil" by Hanajiri, et al. and published on 28 Feb. 2013 relates to an oil or fat composition with reduced trans-fatty acid content while having hydrogenated aroma and flavor as conventional partially hydrogenated oil or fat compositions. The claimed oil or fat composition is produced by oxidizing a partially hydrogenated oil or fat until its peroxide value reaches a certain threshold. However, the oil or fat composition discussed by WO 2013/027439 A1 only simulates the aroma and flavor of hydrogenated soybean oil without providing comparable texture and mouthfeel. Also, the discussed oxidation process is complex and is thus not suitable for industrial production.

As such, there is a need in the food industry for oils or oil compositions for non-dairy creamers that can provide equally good mouth feel and flavor as hydrogenated soybean oil without carrying the same negative health consequences thereof.

SUMMARY OF THE INVENTION

An aspect of the present invention relates to a non-dairy creamer including a triglyceride composition. The triglyceride composition includes triglycerides having a total fatty acid content, the triglycerides containing a lauric acid content of from about 5 wt % to about 30 wt %, by weight of the total fatty acid content; a palmitic acid content of from about 20 wt % to about 45 wt %, by weight of the total fatty acid content; a myristic acid content of from about 2 wt % to about 8 wt %, by weight of the total fatty acid content; a stearic acid content of from about 2 wt % to about 6 wt %, by weight of the total fatty acid content; a linoleic acid content of from about 3 wt % to about 10 wt %, by weight of the total fatty acid content; and an oleic acid content of from about 25 wt % to about 40 wt %, by weight of the total fatty acid content. The triglyceride composition has a trans fatty acid value of from about 0 wt % to about 1 wt % by weight of the total fatty acid content, an oxidative stability index of greater than about 15 h at a temperature of 120° C. and an airflow rate of 20 L/h, a saturated fatty acid content of from about 55 wt % to about 65 wt % by weight of the total fatty acid content, a slip melting point of from about 22° C. to about 40° C., and a total volatile aldehyde content of from about 1 wt % to about 5 wt % by weight of the triglyceride composition.

Another aspect of the present invention relates to a beverage containing the non-dairy creamer according to the present invention.

A further aspect of the present invention relates to a food item containing the non-dairy creamer according to the present invention.

A yet further aspect of the present invention relates to a method of making a non-dairy creamer according to the present invention. The method includes the step of providing a triglyceride composition including triglycerides having a total fatty acid content, the triglycerides containing: a lauric acid content of from about 5 wt % to about 30 wt %, by weight of the total fatty acid content; a palmitic acid content of from about 20 wt % to about 45 wt %, by weight of the total fatty acid content; a myristic acid content of from about 2 wt % to about 8 wt %, by weight of the total fatty acid content; a stearic acid content of from about 2 wt % to about 6 wt %, by weight of the total fatty acid content; a linoleic acid content of from about 3 wt % to about 10 wt %, by weight of the total fatty acid content; and an oleic acid content of from about 25 wt % to about 40 wt %, by weight of the total fatty acid content. The method further includes the steps of decolorizing the triglyceride composition with activated bleaching earth and activated carbon at from about 105° C. to about 115° C. and deodorizing the triglyceride composition through a packed tower and plate tower at a temperature of from about 220° C. to about 270° C. for a time period of from about 2 to about 4 hours and at a steam amount of about 0 Kg/h to about 300 Kg/h. The decolorized and deodorized triglyceride composition has a trans fatty acid value of about 0 wt % to about 1 wt % by weight of the total fatty acid content, an oxidative stability index of greater than about 15 h at a temperature of 120° C. and an airflow rate of 20 L/h, a saturated fatty acid content of from about 55 wt % to about 65 wt % by weight of the total fatty acid content, a slip melting point of from about 22° C. to about 40° C., and a total volatile aldehyde content of from about 1 wt % to about 5 wt % by weight of the triglyceride composition.

DETAILED DESCRIPTION OF THE INVENTION

Unless otherwise noted, all measurements, weights, lengths etc. are in metric units, and all temperatures are in degrees Celsius. It is understood that unless otherwise specifically noted, the materials compounds, chemicals, etc. described herein are typically commodity items and/or industry-standard items available from a variety of suppliers and sources worldwide.

As used herein, the term "triglyceride composition" refers to a composition the main components of which are one or more triglycerides. A triglyceride refers to an ester of glycerol with three fatty acids. A triglyceride may be an oil or a fat, derived from various sources including plants, animals and microorganisms.

As used herein, the term "oil" refers to an oil individually or a blend of two or more different oils. By the same token, the term "fat" refers to a fat individually or a blend of two or more fats.

Unless otherwise stated, the term "total fatty acid content" refers to the weight percentage of the fatty acid moieties in the triglycerides of the triglyceride composition, and the content of a specific fatty acid refers to the weight percentage of that specific fatty acid moiety in relation to the total fatty acid content. It has been found that the weight percentage of a fatty acid in total fatty acids has a significantly linear relationship with the corresponding triglyceride content via a specific coefficient (see, e.g., "Identification of Characteristic Fatty Acids to Quantify Triacylglycerols in Microalgae.", Shen, et al, Front Plant Sci. 2016 Feb. 22; 7:162. doi: 10.3389/fpls.2016.00162. eCollection 2016). In the present invention, a coefficient of 0.94 may be used. That is to say, the weight percentage of the corresponding triglyceride of that specific fatty acid in the triglycerides of the triglyceride composition can be determined through dividing the content of that specific fatty acid by 0.94.

As used herein, the term "semiliquid" refers to a substance having the qualities of both a liquid and a solid.

As used herein, the term "bleaching earth" refers to clay of a white or white greyish color generally composed of one or more of montmorillonites, albites and quartz. The term "activated bleaching earth" includes both acid-activated bleaching earth and neutral bleaching earth.

As used herein, the term "interestification" (or "interest-erification") refers to a process wherein the fatty acid moieties redistribute over the glycerol moieties in a triglyceride.

An aspect of the present invention relates to a non-dairy creamer including a triglyceride composition. The triglyceride composition includes triglycerides having a total fatty acid content, the triglycerides containing: a lauric acid content of from about 5 wt % to about 30 wt %, by weight of the total fatty acid content; a palmitic acid content of from about 20 wt % to about 45 wt %, by weight of the total fatty acid content; a myristic acid content of from about 2 wt % to about 8 wt %, by weight of the total fatty acid content; a stearic acid content of from about 2 wt % to about 6 wt %, by weight of the total fatty acid content; a linoleic acid content of from about 3 wt % to about 10 wt %, by weight of the total fatty acid content; and an oleic acid content of from about 25 wt % to about 40 wt %, by weight of the total fatty acid content. The triglyceride composition has a trans fatty acid value of from about 0 wt % to about 1 wt % by weight of the total fatty acid content, an oxidative stability index of greater than about 15 h at a temperature of 120° C. and an airflow rate of 20 L/h, a saturated fatty acid content of from about 55 wt % to about 65 wt % by weight of the total fatty acid content, a slip melting point of from about 22° C. to about 40° C., and a total volatile aldehyde content of from about 1 wt % to about 5 wt % by weight of the triglyceride composition.

Without intending to be bound by theory, it has been found that a triglyceride composition with the specific fatty acid profile and other properties as required by the present invention may simulate the flavor, mouthfeel and texture of hydrogenated soybean oil with a trans fatty acid content of 1 wt % or lower. As such, the non-dairy creamer including the triglyceride composition according to the present invention avoids the deleterious health effects associated with hydrogenated oils.

Another advantage of the non-dairy creamer according to the present invention is that it may be made with a non-soy based oil emulsion and thus may exclude the presence of lactose and/or casein or salt thereof. As such, a lactose- and casein-free embodiment of the present invention may be especially appealing to consumers with lactose intolerance and/or a casein allergy. Such a non-dairy creamer may also be well received by, for example, vegan consumers, whose number has increased substantially in recent years.

A yet further advantage of the non-dairy creamer according to the present invention is that it may be made of low-cost and easily accessible raw materials, and in a commercially-viable process and is thus particularly suitable for large-scale industrial production.

In an embodiment, the lauric acid content is from about 6 wt % to about 25 wt %; or from about 8 wt % to about 23 wt %, by weight of the total fatty acid content. In an embodiment, the palmitic acid content is from 23 wt % to about 43 wt %; or from about 25 wt % to about 40 wt %, by weight of the total fatty acid content. In an embodiment, the myristic acid content is from about 2.5 wt % to about 7.5 wt %; or from about 3 wt % to about 7 wt %, by weight of the total fatty acid content. In an embodiment, the stearic acid content is from about 3 wt % to about 5 wt %; or from about 3.5 wt % to about 4.5 wt %, by weight of the total fatty acid content. In an embodiment, the linoleic acid content is from about 5 wt % to about 9 wt %; or from about 5.5 wt % to about 8.5 wt %, by weight of the total fatty acid content. In an embodiment, the oleic acid content is from about 27 wt % to about 37 wt %; or from about 29 wt % to about 35 wt %, by weight of the total fatty acid content.

Without intending to be bound by theory, it is believed that the specific fatty acid profile contributes to the specific flavor, mouthfeel and texture of the non-dairy creamer of the present invention. Specifically, it is believed that the presence of lauric acid and myristic acid triglycerides contributes to a clean flavor and good mouthfeel. It is also believed that the presence of palmitic acid and stearic acid triglycerides helps produce the richness of the flavor and texture. Further, while the presence of linoleic acid triglycerides contributes to the specific flavor of the non-dairy creamer according to the present invention, it is believed that a high linoleic acid triglyceride content would shorten the shelf-life of the non-dairy creamer due to its susceptibility to oxidation. As such, the amount of linoleic acid triglycerides should be carefully controlled to be within the specific range of the present invention, such that the non-dairy creamer delivers a stable flavor over time and has an acceptable shelf-life. It is also believed that the presence of oleic acid triglycerides contributes to a moderate flavor and mouthfeel of the non-dairy creamer of the present invention.

As noted above, inventors of the present application has discovered that a triglyceride composition having a specific fatty acid profile and decolorized and deodorized as required by the present invention may serve as a suitable substitute for hydrogenated soybean oil in non-dairy creamers, delivering comparable flavor, mouthfeel and texture. Without intending to be bound by theory, it is believed that, for example, Yasuda, et al. teaches away from the present invention. This is because Yasuda, et al. identified volatile compounds in hydrogenated soybean oil developed during storage as playing an important role in contributing to the hydrogenation flavor, whereas in the present invention volatile aldehyde content is reduced to/present at about 1 wt % to about 5 wt %; or about 1 wt % to about 3 wt %, by weight of the triglyceride composition. Also, without intending to be limited by theory, it is believed that the triglyceride composition according to the present invention, irrespective of whether it is freshly produced or after a storage period, consistently delivers flavor, mouthfeel and texture comparable to hydrogenated soybean oil.

In another embodiment, the non-dairy creamer according to the present invention further includes one or more components selected from the group consisting of, for example, a sweetening substance, an antioxidant, a filler, a protein strengthener, a flavoring substance, a pigment, a flavor/mouthfeel enhancer, a thickening, gelling, stabilizing or emulsifying agent, a health boosting ingredient, a solvent, and a combination thereof.

In an embodiment, the sweetening substance is selected from the group consisting of a sugar, a sugar substitute, and a combination thereof; or selected from the group consisting of acesulfame potassium, alitame, aspartame, cyclamate, saccharin, sucralose, thaumatin, nenotame, sucrose, fructose, isomalt, lactitol, mannitol, maltitol, xylitol, sorbitol, maltodextrin, polydextrose, and a combination thereof. A person skilled in the art will appreciate that the addition of sweetening substance and the specific selection thereof can be determined based on actual needs. For instance, for a non-dairy creamer targeting health-conscious consumers, a skilled person may determine to not add any high-calorie sweetener at all, or to add sweeteners derived from a specific natural source only.

In an embodiment, the flavoring substance is selected from the group consisting of a vanilla extract, vanillin, a banana flavoring oil, a banana flavoring extract, an almond flavoring oil, an almond flavoring extract, a coconut flavoring oil, a coconut flavoring extract, a coffee flavoring oil, a coffee flavoring extract, a hazelnut flavoring oil, a hazelnut flavoring extract, a cinnamon flavoring oil, a cinnamon flavoring extract, a tea flavoring oil, a tea flavoring extract, a pecan flavoring oil, a pecan flavoring extract, a caramel flavoring oil, a caramel flavoring extract, a turmeric flavoring oil, a turmeric flavoring extract, a soy flavoring oil, a soy flavoring extract, and a combination thereof.

In an embodiment, the pigment is selected from the group consisting of titanium dioxide, calcium carbonate, a carotenoid and derivative thereof, a retinol and derivative thereof, and a riboflavin and derivative thereof. A person skilled in the art will appreciate that certain types of food pigments may carry additional health benefits other than providing the non-dairy creamer with a desirable color. For instance, carotenoids are known to potentially boost the immune system and have inflammatory properties. Also, a skilled person should understand that the pigments listed herein is not an exhaustive list; the use of a specific pigment may be determined by a skilled person based on one or more factors such as the desired color, its health benefit and food regulation of a specific jurisdiction etc.

In an embodiment, the thickening agent, gelling agent, stabilizing agent or an emulsifying agent is selected from the group consisting of acacia gum, xanthan gum, carrageenan, lecithin, an ester of monoglyceride of a fatty acid, monoglyceride of a fatty acid, diglyceride of fatty acids, an agar, an alginate, guar gum, locust bean gum, pectin, sodium carboxymethyl cellulose, starch, sodium caseinate, and a combination thereof. In some embodiments, a thickening agent, a gelling agent, a stabilizing agent or an emulsifying agent may be particularly beneficial to mimic the appearance and/or performance of a dairy-based creamer. For instance, it may be desirable for certain consumers that the non-dairy creamer according to the present invention does not "break" when it is added to a hot beverage. The specific selection of a thickening agent, a gelling agent, a stabilizing agent or an emulsifying agent can be determined by a skilled person based on actual needs.

In an embodiment, the protein strengthener may be selected from the group consisting of sodium caseinate, whey protein, soy protein, other proteins derived from animal- or plant-based sources and a combination thereof. A person skilled in the art should understand that the addition of a protein strengthener may not be necessary. Further, a skilled person will also understand that certain types of protein strengtheners should be avoided in some cases. For instance, for a non-dairy creamer developed for lactose-intolerant and/or casein-allergic consumers, sodium caseinate and dairy-product derived protein strengtheners should be avoided.

In an embodiment, the flavor/mouthfeel enhancer is selected from the group consisting of calcium inosinate, ethyl maltol, inosinic acid, disodium guanylate, disodium inosinate, disodium ribonucleotides, glutamic acid, glumamate flavoring, glycine, guanosine monophosphate, maltol, monopotassium glutamate, monosodium glutamate, milk, milk powder, and a combination thereof. A person skilled in the art may conceive of the use of other conventional flavor/mouthfeel enhancers, depending on the flavor/mouthfeel a non-dairy creamer intends to deliver.

In an embodiment, the antioxidant may be a carotenoid, which are discussed above. Suitable antioxidants may also include a retinol (e.g., vitamin A) and/or a riboflavis (e.g., vitamin B). Other possible antioxidants may be selected from the group consisting of tertiary butylhydroquinone, a tea polyphenol, berberine, silymarin, a flavonoid, a flavonoid derivative, ascorbic acid (e.g., vitamin C), an ascorbic acid derivative, retinol (e.g., vitamin A), a retinol derivative, a butylated hydroxyanisole, a butylated hydroxytoluene, propyl gallate, guaiac resin, isopropyl citrate, stannous chloride, thiodipropionate (e.g., dilauryl thiodipropionate) and a combination thereof. Citric acid may be added in conjunction with the antioxidant. Without intending to be bound by theory, it is believed that the citric acid could act in synergy with the antioxidant to boost the antioxidizing effect, thereby further extending the shelf-life of the non-dairy creamer. The antioxidant may also have beneficial health effects, such as boosting the immune system, etc.

In an embodiment, the health boosting ingredient is selected from a fiber source, a mineral, a vitamin, and a combination thereof. A riboflavins, a retinol, and/or ascorbic acid, discussed above, are also potential selections for vitamins which may be added to the non-dairy creamer according to the present invention. Other non-limiting exemplary examples of such vitamins include vitamins D, E and K. A potential fiber source which may be used in the present invention includes cellulose. Possible minerals, on the other hand, may have a cation selected from the group consisting of calcium, magnesium, iron and potassium and an anion selected from the group consisting of chloride, phosphate and sulphate.

In an embodiment, the filler may be selected from the group consisting of cellulose, a soy derivative, and a combination thereof. As noted above, cellulose may also serve as a potential fiber source.

In an embodiment, the solvent used for the non-dairy creamer according to the present invention is water. The non-dairy creamer may be selected from the group consisting of a liquid, a semiliquid, and a combination thereof. In another embodiment, the non-dairy creamer does not contain a solvent, and is in a granular form.

In a further embodiment, the non-dairy creamer may contain an additive selected from the group consisting of calcium carbonate, acetic acid, potassium acetate, sodium acetate, calcium acetate, lactic acid, carbon dioxide, malic acid, ascorbic acid, sodium ascorbate, calcium ascorbate, a fatty acid ester of ascorbic acid, tocopherol-rich extract, alpha-tocopherol, gamma-tocopherol, delta-tocopherol, lecithin, sodium lactate, potassium lactate, calcium lactate, citric acid, sodium citrate, potassium citrate, calcium citrate, tartaric acid, sodium tartrate, potassium tartrate, sodium potassium tartrate, sodium malate, potassium malate, calcium malate, calcium tartrate, triammonium citrate, alginic acid, sodium alginate, potassium alginate, ammonium alginate, calcium alginate, agar, carrageenan, processed euchema seaweed, locust bean gum, guar gum, tragacanth, gum Arabic, xanthan gum, tara gum, gellan gum, sorbitol, mannitol, glycerol, konjac, pectin, cellulose, methyl cellulose, ethyl cellulose, hydroxypropyl cellulose, hydroxpropyl methyl cellulose, ethyl methyl cellulose, sodium carboxy methyl cellulose and cellulose gum, enzymatically hydrolysed carboxy methyl cellulose and cellulose gum, sodium/potassium/calcium salt of a fatty acid, magnesium salt of a fatty acid, an acetic acid ester of mono- and diglyceride of fatty acids, a lactic acid ester of mono- and diglyceride of fatty acids, a citric ester of mono- and diglyceride of fatty acids, a tartaric acid ester of mono- and diglyceride of fatty acids, mono and diacetyl tartaric acid ester of mono- and diglyceride of fatty acids, mixed acetic and tartaric acid ester of mono- and diglyceride of fatty acids, sodium carbonate, potassium carbonate, ammonium carbonate, magnesium carbonate, hydrochloric acid, potassium chloride, calcium chloride, magnesium chloride, sulphuric acid, sodium sulphate, potassium sulphate, calcium sulphate, sodium hydroxide, potassium hydroxide, calcium hydroxide, ammonium hydroxide, magnesium hydroxide, calcium oxide, magnesium oxide, fatty acid, gluconic acid, glucono-delta-lactone, sodium gluconate, potassium gluconate, calcium gluconate, glutamic acid, monosodium glutamate, monopotassium glutamate, magnesium diglutamate, guanylic acid, disodium guanylate, dipotassium guanylate, calcium guanylate, inosinic acid, disodium inosinate, dipotassium inosinate, calcium inosinate, calcium 5'-ribonucleotides, disodium 5'-ribonucleotides, glycine and sodium salt thereof, L-cysteine, argon, helium, nitrogen, nitrous oxide, oxygen, hydrogen, isomalt, maltitol, lactitol, xylitol, erythritol, invertase, polydextrose, oxidized starch, monostarch phosphate, distarch phosphate, phosphate distarch phosphate, acetylated distarch phosphate, acetylated starch, acetylated distarch adipate, hydroxy propyl starch, hydroxyl propyl distarch phosphate, starch sodium octenyl succinate, acetylated oxidized starch, sorbic acid, potassium sorbate, sodium nitrate, potassium nitrate, phosphoric acid, sodium phosphate, potassium phosphate, calcium phosphate, magnesium phosphate, a diphosphate, a triphosphate, a polyphosphate, propionic acid, sodium propionate, calcium propionate, potassium propionate, polyoxyethylene sorbitan monolaurate (polysorbate 20), polyoxyethylene sorbitan monooleate (polysorbate 80), polyoxyethylene sorbitan monopalmitate (polysorbate 40), polyoxyethylene sorbitan monostearate (polysorbate 60), polyoxyethylene sorbitan tristearate (polysorbate 65), a sucrose ester of a fatty acid, a sucroglyceride, a polyglycerol ester of a fatty acid, a propane-1,2-diol ester of a fatty acid, sodium stearoyl-2-lactylate, calcium stearoyl-2-lactylate, sorbitan monostearate, sorbitan tristearate, sorbitan monolaurate, sorbitan monooleate, sorbitan monopalmitate, silicon dioxide, calcium silicate, magnesium silicate and talc, a riboflavin, chlorophyl, chlorophyllin, a copper complex of chlorophyl, a copper complex of chlorophyllin, plain caramel, caustic sulphite caramel, ammonia caramel, sulphite ammonia caramel, vegetable carbon, carotene, paprika extract, capsanthin, capsorubin, beetroot red, betanin, anthocyanin, titanium dioxide, iron oxide, a hydroxide and a combination thereof.

Another aspect of the present invention relates to a beverage containing the non-dairy creamer according to the present invention. In an embodiment, the beverage may be selected from the group consisting of tea, coffee, hot chocolate, a shake (such as a milkshake), a smoothie, a cocktail and a combination thereof. A further aspect of the present invention relates to a food item containing the non-dairy creamer according to the present invention. In an embodiment, the food item may be selected from the group consisting of a bakery product, chocolate, a candy, and a combination thereof. It should be appreciated that the non-dairy creamer according to the present invention may also be applied to any other beverage or food item where a typical creamer is desired.

A yet further aspect of the present invention relates to a method of making a non-dairy creamer according to the present invention. The method includes the step of providing a triglyceride composition including triglycerides having a total fatty acid content, the triglycerides containing a lauric acid content of from about 5 wt % to about 30 wt %, by weight of the total fatty acid content; a palmitic acid content of from about 20 wt % to about 45 wt %, by weight of the total fatty acid content; a myristic acid content of from about 2 wt % to about 8 wt %, by weight of the total fatty acid content; a stearic acid content of from about 2 wt % to about 6 wt %, by weight of the total fatty acid content; a linoleic acid content of from about 3 wt % to about 10 wt %, by weight of the total fatty acid content; and an oleic acid content of from about 25 wt % to about 40 wt %, by weight of the total fatty acid content.

The method further includes the steps of decolorizing the triglyceride composition with activated bleaching earth and activated carbon at from about 105° C. to about 115° C. and deodorizing the triglyceride composition through a packed tower and plate tower at a temperature of from about 220° C. to about 270° C. for a timer period of from about 2 to about 4 hours and at a steam amount of about 0 Kg/h to about 300 Kg/h, where the decolorized and deodorized triglyceride composition has a trans fatty acid value of about 0 wt % to about 1 wt % by weight of the total fatty acid content, an oxidative stability index of greater than about 15 h at a temperature of 120° C. and an airflow rate of 20 L/h, a saturated fatty acid content of from about 55 wt % to about 65 wt % by weight of the total fatty acid content, a slip melting point of from about 22° C. to about 40° C., and a total volatile aldehyde content of from about 1 wt % to about 5 wt % by weight of the triglyceride composition.

Without intending to be bound by theory, it is believed that the decolorizing and deodorizing steps contribute to the mouthfeel, flavor and texture of the triglyceride composition of the present invention. Decolorization removes the undesirable color of an oil, and also reduces the amounts of chlorophyll, soap and gums, metals as well as oxidation products therein. While decolorization may look to be a simple process, its success and efficiency can be a challenge and substantially hinge on process variables. For instance, while a greater contact time between bleaching earth and oil may improve color and contaminant removal, it may in turn lead to the darkening of the deodorized oil, due to undesirable oxidation and reduction reactions taking place on the active surface of the bleaching earth used in the process. The inventors of the present invention have surprisingly found that decolorization conducted with a mixture of activated bleaching earth and activated carbon at from about 105° C. to about 115° C. achieves an improved result. Activated carbon is generally not used for decolorization.

Deodorization is also a complex process. Insufficient deodorization leaves undesirable flavor precursors in the oil, leading to the development of off-flavors during storage or use of the oil. Such phenomenon is commonly known as "flavor reversion" in the industry. However, thus far there has not been a full understanding of the mechanism behind flavor reversion. Nevertheless, the inventors of the present invention have discovered that deodorization at from about 220° C. to about 270° C. for a period of from about 2 to about 4 hours effectively removes the volatile compounds which it is believed would interfere with the flavor of the triglyceride composition of the present invention. This deodorization also has been found to sufficiently remove undesirable flavor precursors, such that the triglyceride composition of the present invention provides a consistent and stable flavor when used in a non-dairy creamer without off-flavor development, thereby providing improved shelf-life.

In an embodiment, the packed tower and the plate tower are in a combined deodorization tower and the packed tower is above the plate tower.

In an embodiment, the deodorization temperature is from about 240° C. to about 270° C.; or from about 235° C. to about 265° C.

In an embodiment, the steam amount is from about 0.08% to about 0.16%; or from about 0.1% to about 0.18%.

In an embodiment, an amount of the activated bleaching earth is from about 0.2 wt % to about 2 wt %, by weight of the triglyceride composition, and an amount of the activated carbon is from about 0.2 wt % to about 2 wt %, by weight of the triglyceride composition. In a specific embodiment, one or more of the activated bleaching earth and the activated carbon is in an amount of about 0.5 wt %.

In an embodiment, the decolorization is conducted at a temperature of about 110° C. In an embodiment, the deodorization is conducted at a temperature of about 240° C.

In an embodiment, the step of providing of the triglyceride composition includes mixing a first triglyceride with a second triglyceride, wherein each of the first triglyceride and second triglyceride is selected from the group consisting of an oil derived from a plant source, a fat derived from a plant source, an oil derived from an animal source, a fat derived from an animal source, and an oil derived from a microorganism source, a fat derived from a microorganism source and a combination thereof.

In an embodiment, the oil and/or fat derived from a plant source may be selected from the group consisting of coconut oil, corn oil, canola oil, cottonseed oil, olive oil, palm oil, peanut oil, rapeseed oil, safflower oil, sesame oil, soybean oil, sunflower oil, almond oil, beech nut oil, brazil nut oil, cashew oil, hazelnut oil, macadamia oil, mongongo nut oil, pecan oil, pine nut oil, pistachio oil, walnut oil, pumpkin seed oil, grapefruit seed oil, lemon oil, orange oil, bitter gourd oil, bottle gourd oil, buffalo gourd oil, butternut squash seed oil, egusi seed oil, watermelon seed oil, acai oil, black seed oil, blackcurrant seed oil, borage seed oil, evening primrose oil, flaxseed oil, amaranth oil, apricot oil, apple seed oil, argan oil, avocado oil, babassu oil, ben oil, borneo tallow nut oil, cape chestnut oil, carob pod oil, cocklebur oil, cohune oil, coriander seed oil, date seed oil, dika oil, false flax oil, grape seed oil, kapok seed oil, kenaf seed oil, lallemantia oil, mafura oil, marula oil, meadowfoam seed oil, mustard oil, niger seed oil, nutmeg butter, okra seed oil, papaya seed oil, perilla seed oil, persimmon seed oil, pequi oil, pili nut oil, pomegranate seed oil, poppyseed oil, pracaxi oil, virgin pracaxi oil, prune kernel oil, quinoa oil, ramtil oil, rice bran oil, royle oil, sacha inchi oil, sapote oil, seje oil, shea butter, taramira oil, tea seed oil, thistle oil, tigernut oil, tobacco seed oil, tomato seed oil, wheat germ oil and a combination thereof.

In an embodiment, the oil and/or fat derived from an animal source may be selected from the group consisting of oil or fat derived from a pig, a chicken, a cow, a duck, a goose, cheese, butter, milk and a combination thereof. A person skilled in the art will understand that the addition or omission of an oil and/or fat derived from an animal source may be determined based on, for instance, the target consumer group of the non-dairy creamer. In the case of a non-dairy creamer developed for vegan consumers, such oil and/or fat should be avoided. Likewise, in order to achieve a non-dairy creamer with low potential allergen and/or for those who are lactose intolerant, the addition of oil and/or fat derived from dairy products should be avoided.

In an embodiment, the oil and/or fat derived from a microorganism source may be selected from oil and/or fat produced by a bacteria, a yeast, a fungus, an algae, and a combination thereof. For instance, oils produced by *Mortierella alpina*, *Crypthecodinium cohnii* and *Schizochytrium* spp may be used.

In an embodiment, the method further includes a step selected from the group consisting of fractionation, hydrogenation, interestification, and a combination thereof.

EXEMPLARY EMBODIMENTS

The palm mid fractions, palm kernel olein, refined palm olein, refined palm stearin, palm oil and hydrogenated soybean oil tested in the following examples were obtained from Cargill, and produced in Cargill's China Nantong plant.

Example 1

In this example, triglyceride composition A is made by first mixing palm mid fractions (PMF) and palm kernel olein (PKOL). The PMF is about 70 wt % and the PKOL is about 30 wt %, by weight of the triglyceride composition A. The PMF and PKOL mixture then goes through a vacuum bleaching process (i.e., decolorization) at about 110° C., in the presence of about 0.5 wt % of activated bleaching earth and about 0.5 wt % of activated carbon. The PMF and PKOL mixture then undergoes deodorization at a temperature of about 240° C. for a period of about 2 hours, affording the triglyceride composition A. The specific fatty acid profile of the triglyceride composition A is set forth in Example 4.

Tea is made and is divided into three equal volumes. The triglyceride composition A is used as a non-dairy creamer and added to one of the three volumes. Palm oil and hydrogenated soybean oil (HSBO) are added to the other two volumes respectively in the same weight amount for comparison with the triglyceride composition A.

A sensory panel of five well trained panelists is asked to score on a scale of 1 to 10 each milk tea with the triglyceride composition A, palm oil and HSBO respectively, in terms of flavor, mouthfeel and texture. HSBO is used as control and is assigned a score of 10 in each evaluation aspect. The evaluation result by the sensory panel is summarized below in Table 1.

TABLE 1

| Sensory Evaluation of Triglyceride Composition A, Palm Oil and HSBO as Creamers | | | |
|---|---|---|---|
| | Triglyceride Composition A | Palm oil | HSBO |
| Pleasant flavor | 9 | 6 | 10 |
| Milky flavor | 9 | 7 | 10 |
| Smoothness | 10 | 6 | 10 |
| Richness | 9 | 7 | 10 |

It can be seen from Table 1 that the triglyceride composition A is comparable to HSBO in flavor, mouthfeel and texture, without carrying the same negative health consequences as HSBO due to the presence of trans fatty acids. Also, the triglyceride composition A has better performance than palm oil itself in all aspects of flavor, mouthfeel and texture.

Example 2

In this example, triglyceride composition B is made by first mixing refined palm olein (ROL), refined palm stearin (RPS) and palm kernel olein (PKOL). The ROL is about 55 wt %, the RPS is about 17 wt % and the PKOL is about 28 wt %, by weight of the triglyceride composition B. The ROL, RPS and PKOL mixture then goes through a decolorization (e.g., a vacuum bleaching) process at about 110° C., in the presence of about 0.5 wt % of activated bleaching earth and about 0.5 wt % of activated carbon. The ROL, RPS and PKOL mixture then undergoes deodorization at a temperature of about 240° C. for a period of about 1 hour, affording the triglyceride composition B. The specific fatty acid profile of the triglyceride composition B is set forth in Example 4.

The chemical and physical properties of the triglyceride composition B as compared to palm oil and HSBO is summarized in Table 2 below, showing the slip melting point (SMP), oxidative stability index (OSI), trans fatty acid content (TFA) and volatile aldehyde content

TABLE 2

| Chemical and Physical Properties of Triglyceride Composition B, Palm Oil and HSBO | | | |
|---|---|---|---|
| | Triglyceride Composition B | Palm oil | HSBO |
| SMP (° C.) | 27.1 | 37.5 | 38 |
| OSI (120° C./20 L/h) | 16.3 | 11 | 31 |
| TFA (wt %) | 0.9 | 0.8 | 42.8 |
| Content of Volatile Aldehydes* (wt %) | 1.98 | 22.2 | 19.8 |

*Content of volatile aldehydes is analyzed in accordance with "Identification of Volatile Flavor Compounds Developed during Storage of a Deodorized Hydrogenated Soybean Oil" by KOSAKU YASUDA, *JAOCS* August 1975.

Tea is made and is divided into three equal volumes. The triglyceride composition B is used as a non-dairy creamer and added to one of the three volumes. Palm oil and HSBO are added to the other two volumes respectively in the same weight amount for comparison with the triglyceride composition B.

A sensory panel of five well trained panelists is asked to score on a scale of 1 to 10 each milk tea with the triglyceride composition B, palm oil and HSBO respectively, in terms of flavor, mouthfeel and texture. HSBO is used as control and is assigned a score of 10 in each evaluation aspect. The evaluation result by the sensory panel is summarized below in Table 3.

TABLE 3

| Sensory Evaluation of Triglyceride Composition B, Palm Oil and HSBO as Creamers | | | |
|---|---|---|---|
| | Triglyceride Composition B | Palm oil | HSBO |
| Pleasant flavor | 9 | 6 | 10 |
| Milky flavor | 9 | 7 | 10 |
| Smoothness | 10 | 6 | 10 |
| Richness | 10 | 7 | 10 |

Once again, it can be seen from Table 3 that the triglyceride composition B is comparable to HSBO in flavor, mouthfeel and texture, but has a much lower trans fatty acid content than HSBO as shown by Table 2.

Example 3

In this example, triglyceride composition C is made by first mixing refined palm olein (ROL), refined palm stearin (RPS) and palm kernel olein (PKOL). The ROL is about 55 wt %, the RPS is about 17 wt % and the PKOL is about 28 wt %, by weight of the triglyceride composition C. The ROL, RPS and PKOL mixture then goes through a vacuum bleaching process (i.e., decolorization) at about 110° C., in the presence of about 0.5 wt % of activated bleaching earth and about 0.5 wt % of activated carbon. The ROL, RPS and PKOL mixture then undergoes deodorization at a temperature of about 240° C. for a period of about 1 hour. After the bleaching and deodoration, an antioxidant is added at an amount of about 400 ppm to enhance the stability of the triglyceride composition C. In this specific example, the antioxidant is tea polyphenol. The specific fatty acid profile of the triglyceride composition C is the same as that of the triglyceride composition B discussed in Example 2.

The triglyceride composition C is stored in an oven at about 55° C. to monitor the peroxide value (PV) of the composition during its shelf-life. The triglyceride composition C is also evaluated for flavor, mouthfeel and texture by a sensory panel of five panelists during shelf-life, where milk tea made using the triglyceride composition C as a non-dairy creamer is tested at various time points. The results of these tests are summarized in Table 4 below.

TABLE 4

Performance of Triglyceride Composition C during Shelf-Life

|  | Fresh sample | 63 days | 84 days |
| --- | --- | --- | --- |
| PV (mmol/kg) | 0.15 | 0.38 | 0.45 |
| Pleasant flavor | 9 | 9 | 8.5 |
| Milky flavor | 9 | 8.5 | 9 |
| Smoothness | 10 | 10 | 10 |
| Richness | 10 | 10 | 10 |

It can be seen from the above table that the triglyceride composition C with tea polyphenol is stable during a shelf-life of 84 days. It is known in the art that in general PV should not be above 10-20 meq/kg fat; otherwise there will be rancidity flavor. At the time point of the 84th day, the PV of the triglyceride composition C is 0.45, well below the threshold of 10-20 meq/kg. Such a stability in terms of PV also reflects the stability of the triglyceride composition C in its flavor, mouthfeel and texture, which is confirmed by the results of the sensory panel evaluation also shown in Table 4.

Example 4

In this example, various triglyceride compositions according to the present invention are made. Table 5 below shows the fatty acid profile for each of these compositions, including the trans fatty acid content (TFA).

The compositions A and B shown in Table 5 are the same compositions tested in example 1 and 2 respectively. Composition D is made by mixing about 50 wt % of palm mid fraction and 50 wt % of palm kernel olein, by weight of the composition. Composition E is made by mixing about 56 wt % of refined palm olein and about 24 wt % of refined palm stearin. Both Compositions D and E undergo decolorization and deodorization according to the present invention.

14

TABLE 5

TABLE 5-continued

Fatty Acid Profile of Various Triglyceride Compositions

| Triglyceride Composition | Composition A | Composition B | Composition D | Composition E |
| --- | --- | --- | --- | --- |
| C6:0 Caproic acid | 0.1 | 0.1 | 0.2 | 0.1 |
| C8:0 Caprylic acid | 1.3 | 1.3 | 2.1 | 0.9 |
| C10:0 Capric acid | 1.1 | 1.1 | 1.8 | 0.7 |
| C12:0 Lauric acid | 13.0 | 12.9 | 21.5 | 8.7 |
| C14:0 Myristic acid | 4.6 | 4.6 | 6.9 | 3.4 |
| C16:0 Palmitic acid | 34.8 | 34.9 | 27.4 | 38.6 |
| C16:1 Palmitoleic acid | 0.1 | 0.1 | 0.1 | 0.1 |
| C17:0 Margaric acid | 0.1 | 0.1 | 0.1 | 0.1 |
| C17:1 Heptadecanoic acid | 0.0 | 0.0 | 0.0 | 0.0 |
| C18:0 Stearic acid | 4.3 | 3.9 | 3.9 | 4.1 |
| C18:1 Oleic acid | 32.9 | 32.8 | 29.5 | 34.5 |
| C18:2 Linoleic acid | 7.1 | 7.6 | 6.0 | 8.2 |
| C18:3 Linolenic acid | 0.1 | 0.1 | 0.1 | 0.2 |
| C20:0 Arachidic acid | 0.3 | 0.3 | 0.3 | 0.3 |
| C20:1 Gondoic acid | 0.1 | 0.1 | 0.1 | 0.1 |
| C20:2 Arachidic acid | 0.0 | 0.0 | 0.0 | 0.0 |
| C21:0 Heneicosylic acid | 0.0 | 0.0 | 0.0 | 0.0 |
| C22:0 Behenic acid | 0.1 | 0.0 | 0.0 | 0.0 |
| C22:2 Docosadienoic acid | 0.0 | 0.0 | 0.0 | 0.0 |
| C24:0 Lignoceric acid | 0.1 | 0.0 | 0.1 | 0.0 |
| C24:1 Nervonic acid | 0.0 | 0.0 | 0.0 | 0.0 |
| Lauric fatty acid | 13.0 | 12.9 | 21.5 | 8.7 |
| Saturated Fatty Acids | 57.3 | 56.7 | 60.1 | 55.2 |
| TFA | 0.9 | 0.9 | 0.6 | 0.9 |

Unless otherwise defined, all terms (including technical and scientific terms) used herein have the same meaning as commonly understood by one of ordinary skill in the art to which the embodiments of the invention belong. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

All references specifically cited herein are hereby incorporated by reference in their entireties. However, the citation or incorporation of such a reference is not necessarily an admission as to its appropriateness, citability, and/or availability as prior art to/against the present invention.

The invention claimed is:

1. A non-dairy creamer comprising a triglyceride composition, the triglyceride composition comprises triglycerides comprising a total fatty acid content, the triglycerides comprising:
   (A) a lauric acid (C12:0) content of from about 5 wt % to about 30 wt %, by weight of the total fatty acid content;
   (B) a palmitic acid (C16:0) content of from about 20 wt % to about 45 wt %, by weight of the total fatty acid content;
   (C) a myristic acid (C14:0) content of from about 2 wt % to about 8 wt %, by weight of the total fatty acid content;
   (D) a stearic acid (C18:0) content of from about 2 wt % to about 6 wt %, by weight of the total fatty acid content;
   (E) a linoleic acid (C18:2) content of from about 3 wt % to about 10 wt %, by weight of the total fatty acid content; and
   (F) an oleic acid (C18:1) content of from about 25 wt % to about 40 wt %, by weight of the total fatty acid content,
   wherein the triglyceride composition has a fatty acid content of 96 wt % to 98.3 wt % of C12:0, C14:0, C16:0, C16:1, C17:0, C17:1, C18:0, C18:1, C18:2, C18:3, C20:0, C20:1, C20:2, C21:0, C22:0, C22:2, C24:0, and C24:1 fatty acids,
   wherein the triglyceride composition has
      a trans fatty acid value of from about 0 wt % to about 1% by weight of the total fatty acid content,
      an oxidative stability index of greater than about 15 h at a temperature of 120° C. and an airflow rate of 20 L/h,
      a saturated fatty acid content of from about 55 wt % to about 65 wt % by weight of the total fatty acid content,
      a slip melting point of from about 22° C. to about 40° C., and
      a total volatile aldehyde content of from about 1 wt % to about 5 wt % by weight of the triglyceride composition.

2. The non-dairy creamer according to claim 1, wherein the lauric acid content is from about 6 wt % to about 25 wt %; or from about 8 wt % to about 23 wt %, by weight of the total fatty acid content.

3. The non-dairy creamer according to claim 1, wherein the palmitic acid content is from 23 wt % to about 43 wt %; or from about 25 wt % to about 40 wt %, by weight of the total fatty acid content.

4. The non-dairy creamer according to claim 1, wherein the myristic acid content is from about 2.5 wt % to about 7.5 wt %; or from about 3 wt % to about 7 wt %, by weight of the total fatty acid content.

5. The non-dairy creamer according to claim 1, wherein the stearic acid content is from about 3 wt % to about 5 wt %; or from about 3.5 wt % to about 4.5 wt %, by weight of the total fatty acid content.

6. The non-dairy creamer according to claim 1, wherein the linoleic acid content is from about 5 wt % to about 9 wt %; or from about 5.5 wt % to about 8.5 wt %, by weight of the total fatty acid content.

7. The non-dairy creamer according to claim 1, wherein the oleic acid content is from about 27 wt % to about 37 wt %; or from about 29 wt % to about 35 wt %, by weight of the total fatty acid content.

8. The non-dairy creamer according to claim 1, further comprising a component selected from the group consisting of a sweetening substance, an antioxidant, a filler, a protein strengthener, a flavoring substance, a pigment, a flavor/mouthfeel enhancer, a thickening, gelling, stabilizing or emulsifying agent, a health boosting ingredient, a solvent and a combination thereof.

9. The non-dairy creamer according to claim 8, wherein the sweetening substance is selected from the group consisting of a sugar, a sugar substitute, and a combination thereof; or selected from the group consisting of acesulfame potassium, alitame, aspartame, cyclamate, saccharin, sucralose, thaumatin, nenotame, sucrose, fructose, isomalt, lactitol, mannitol, maltitol, xylitol, sorbitol, maltodextrin, polydextrose and a combination thereof.

10. The non-dairy creamer according to claim 8, wherein the flavoring substance is selected from the group consisting of a vanilla extract, vanillin, a banana flavoring oil, a banana flavoring extract, an almond flavoring oil, an almond flavoring extract, a coconut flavoring oil, a coconut flavoring extract, a coffee flavoring oil, a coffee flavoring extract, a hazelnut flavoring oil, a hazelnut flavoring extract, a cinnamon flavoring oil, a cinnamon flavoring extract, a tea flavoring oil, a tea flavoring extract, a pecan flavoring oil, a pecan flavoring extract, a caramel flavoring oil, a caramel flavoring extract, a turmeric flavoring oil, a turmeric flavoring extract, a soy flavoring oil, a soy flavoring extract, and a combination thereof.

11. The non-dairy creamer according to claim 8, wherein the pigment is selected from the group consisting of titanium dioxide, calcium carbonate, a carotenoid, a carotenoid derivative, a retinol, a retinol derivative, a riboflavin, a riboflavin derivative and a combination thereof.

12. The non-dairy creamer according to claim 8, wherein the thickening, gelling, stabilizing or emulsifying agent is selected from the group consisting of acacia gum, xanthan gum, carrageenan, lecithin, an ester of monoglycerides of a fatty acid, mono-glyceride of a fatty acid, diglyceride of fatty acids, an agar, an alginate, guar gum, locust bean gum, pectin, sodium carboxymethyl cellulose, starch, sodium caseinate, and a combination thereof.

13. The non-dairy creamer according to claim 8, wherein the flavor/mouthfeel enhancer is selected from the group consisting of calcium inosinate, ethyl maltol, inosinic acid, disodium guanylate, disodium inosinate, disodium ribonucleotides, glutamic acid, glumamate flavoring, glycine, guanosine monophosphate, maltol, monopotassium glutamate, monosodium glutamate, milk, milk powder and a combination thereof.

14. The non-dairy creamer according to claim 8, wherein the health boosting ingredient is selected from a fiber source, a mineral, a vitamin and a combination thereof.

15. The non-dairy creamer according to claim 8, wherein the antioxidant is selected from the group consisting of tertiary butylhydroquinone, a tea polyphenol, berberine, silymarin, a carotenoid, a carotenoid derivative, a flavonoid, a flavonoid derivative, vitamin E, vitamin E derivative, ascorbic acid, an ascorbic acid derivative, vitamin A, a vitamin A derivative, butylated hydroxyanisole, butylated hydroxytoluene, propyl gallate, guaiac resin, isopropyl citrate, stannous chloride, thiodipropionate and a combination thereof.

16. The non-dairy creamer according to claim 8, wherein the filler is selected from the group consisting of cellulose, a soy derivative and a combination thereof.

17. The non-dairy creamer according to claim 8, wherein the solvent is water.

18. The non-dairy creamer according to claim 1, wherein the non-dairy creamer is selected from the group consisting of a liquid, a semiliquid, and a combination thereof.

19. The non-dairy creamer according to claim 1, wherein the non-dairy creamer is in a granular form.

20. A beverage comprising a non-dairy creamer according to claim 1.

21. The beverage according to claim 20, wherein the beverage is selected from the group consisting of tea, coffee, hot chocolate, a shake, a smoothie, a cocktail and a combination thereof.

22. A food item comprising a non-dairy creamer according to claim 1.

23. The food item according to claim 22, wherein the food item is selected from the group of a bakery product, chocolate, a candy and a combination thereof.

24. A method of making a non-dairy creamer according to claim 1, comprising:

(A) providing a triglyceride composition comprising triglycerides comprising a total fatty acid content, the triglycerides comprising:

(a) a lauric acid content of from about 5 wt % to about 30 wt %, by weight of the total fatty acid content;

(b) a palmitic acid content of from about 20 wt % to about 45 wt %, by weight of the total fatty acid content;

(c) a myristic acid content of from about 2 wt % to about 8 wt %, by weight of the total fatty acid content;

(d) a stearic acid content of from about 2 wt % to about 6 wt %, by weight of the total fatty acid content;

(e) a linoleic acid content of from about 3 wt % to about 10 wt %, by weight of the total fatty acid content; and (f) an oleic acid content of from about 25 wt % to about 40 wt %, by weight of the total fatty acid content, (B) decolorizing the triglyceride composition at from about 105° C. to about 115° C., wherein activated bleaching earth and activated carbon is used for the decoloring; and (C) deodorizing the triglyceride composition through a packed tower and plate tower at a temperature of from about 220° C. to about 270° C. for a time period of from about 2 to about 4 hours and at a steam amount of about 0 Kg/h to about 300 Kg/h, wherein the decolored and deodorized triglyceride composition has a trans fatty acid value of about 0 wt % to about 1 wt %, by weight of the total fatty acid content, an oxidative stability index of greater than about 15 h at a temperature of 120° C. and an airflow rate of 20 L/h, a saturated fatty acid content of from about 55 wt % to about 65 wt %, by weight of the total fatty acid content, a slip melting point of from about 22° C. to about 40° C., and a total volatile aldehyde content of from about 1 wt % to about 5 wt % by weight of the triglyceride composition.

25. The method of claim 24, wherein the packed tower and the plate tower are in a combined deodorization tower and the packed tower is above the plate tower.

26. The method according to claim 24, wherein the deodorization temperature is from about 240° C. to about 270° C.; or from about 235° C. to about 265° C.

27. The method according to claim 24, wherein the steam amount is from about 0.08% to about 0.16% by weight of the triglyceride composition; or from about 0.1% to about 0.18% by weight of the triglyceride composition.

28. The method according to claim 24, wherein an amount of the activated bleaching earth is from about 0.2 wt % to about 2 wt % by weight of the triglyceride composition, and an amount of the activated carbon is from about 0.2 wt % to about 2 wt % by weight of the triglyceride composition.

29. The method according to claim 24, wherein the providing of the triglyceride composition comprises mixing a first triglyceride with a second triglyceride, wherein each of the first triglyceride and the second triglyceride is selected from the group consisting of an oil derived from a plant source, a fat derived from a plant source, an oil derived from an animal source, a fat derived from an animal source, an oil derived from a microorganism source, a fat derived from a microorganism source and a combination thereof.

30. The method according to claim 24, further comprising a step selected from the group consisting of fractionation, hydrogenation, interestification and a combination thereof.

\* \* \* \* \*